(12) United States Patent
Cho et al.

(10) Patent No.: US 7,187,808 B2
(45) Date of Patent: Mar. 6, 2007

(54) METHOD AND APPARATUS FOR ENHANCING DIGITAL IMAGE QUALITY

(75) Inventors: Won-kyoung Cho, Jeollabuk-do (KR); Goo-soo Gahang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 10/656,835

(22) Filed: Sep. 8, 2003

(65) Prior Publication Data

US 2004/0120600 A1 Jun. 24, 2004

(30) Foreign Application Priority Data

Sep. 14, 2002 (KR) .................. 10-2002-0056011

(51) Int. Cl.
  G06K 9/40 (2006.01)
  G06K 15/00 (2006.01)
  G06K 9/00 (2006.01)
(52) U.S. Cl. .................................... 382/274
(58) Field of Classification Search ................ 382/274, 382/270, 254, 162, 167; 358/1.9, 3.27, 3.26, 358/518; 345/600, 617
  See application file for complete search history.

(56) References Cited

U.S. PATENT DOCUMENTS 6,665,096 B1 * 12/2003 Oh .............................. 358/461

6,809,741 B1 * 10/2004 Bates et al. .................. 345/597
2004/0105032 A1 * 6/2004 Kim et al. ................... 348/607
2004/0252133 A1 * 12/2004 Vuylsteke .................... 345/617

FOREIGN PATENT DOCUMENTS

| EP | 0 920 193 A2 | 6/1999 |
| JP | 10-304196 | 11/1998 |
| KR | 1999-50844 | 7/1999 |

* cited by examiner

Primary Examiner—Yon J. Couso
(74) Attorney, Agent, or Firm—Staas & Halsey LLP

(57) ABSTRACT

A method and apparatus enhances an image quality where original brightness data Xij of a concerned pixel is compared with predetermined brightness levels X1 and X2, which are reference variables to obtain new brightness data Yij, with an enhanced contrast. The method sets initial values of a parameter $V_b$ to calculate the brightness level X1, a parameter $V_p$ to calculate the brightness level X2, the brightness level X1, and the brightness level X2, and compares the brightness data Xij with $V_b$ and $V_p$. The method resets $V_b$ and $V_p$ according to comparison results and identifies a background area according to the comparison results between the brightness data Xij and parameter X1 or X2, and performs the contrast enhancement on pixels belonging to the background area, and updates the brightness levels X1 and X2 using $V_b$ and $V_p$ when the concerned pixel is the last one in the concerned line.

20 Claims, 6 Drawing Sheets

METHOD AND APPARATUS FOR ENHANCING DIGITAL IMAGE QUALITY

CROSS-REFERENCE TO RELATED APPLICATIONS

This application claims the priority of Korean Patent Application No. 2002-56011, filed on Sep. 14, 2002, in the Korean Intellectual Property Office, the disclosure of which is incorporated herein in its entirety by reference.

BACKGROUND OF THE INVENTION

1. Field of the Invention

The present invention relates to an image processing performed to enhance a quality of an image in a document scanned and input by an image input device, and more particularly, to a digital image quality enhancing method and apparatus designed to enhance a quality of digital image on a background region of a document, in which degradation of an image quality occurs.

2. Description of the Related Art

FIG. 1 is a flowchart showing a conventional image processing method to enhance a digital image quality disclosed in Korean Patent Publication No. 1999-43374. When reading a document image using an image input device including a memory for white shading correction, a memory for black shading correction, and a preprocessor with a maximum value detector, the conventional image quality enhancement method generates reference data to correct a distortion of the document image and sets maximum and minimum reference voltages in order to adjust a contrast and a brightness of the document image and to eliminate a background color. The method further compensates for image distortion by simultaneously performing the black shading correction and the white shading correction on the document image using the reference data and by performing image processing on the document image using the set maximum and minimum reference voltages. The method outputs the document image subjected to image distortion correction and image processing as digital image data. In the image input device such as a scanner, the black shading correction is performed to compensate for a difference between pixels due to different characteristics of an image sensor such as a charge coupled device (CCD) or a contact image sensor (CIS). Along with the black shading correction, the white shading correction is performed to correct the distortion caused by non-uniformity in a light source, to correct local variations in reflectivity of a mirror and transmissivity of a lens in a scanner optical system, to correct a contamination on a light path, etc. According to the conventional image processing method, the contrast is corrected based on only the data obtained by the white shading correction and the black shading correction. However, varying a background intensity of the document image cannot be reflected only with the above shading corrections, which makes the conventional image processing method not adaptive to a document. Another problem is that a longer processing time is required for an image quality enhancement because a prescan is necessary to obtain maximum brightness data for brightness correction.

SUMMARY OF THE INVENTION

The present invention provides a method to enhance a digital image quality that enables automatic contrast enhancement at a high speed without a need for preprocessing by being performed adaptively according to a document image having various characteristics input from an image input device included in an image input apparatus.

The present invention also provides a digital image quality enhancing apparatus to perform the above digital image quality enhancing method.

According to an aspect of the present invention, there is provided a method to enhance a digital image quality wherein original brightness data Xij of a concerned pixel is compared with predetermined brightness levels X1 and X2, which are reference variables to obtain new brightness data Yij, with an enhanced contrast, the method including setting initial values of a parameter $V_b$ to calculate the brightness level X1, a parameter $V_p$ to calculate the brightness level X2, the brightness level X1, and the brightness level X2; comparing the brightness data Xij with the parameters $V_b$ and $V_p$, respectively, and outputting results indicative thereof; resetting the parameters $V_b$ and $V_p$ according to the results of the comparison; identifying a background area according to the results of the comparison between the brightness data Xij and parameter X1 or X2; performing the contrast enhancement on pixels belonging to the background area; and updating the brightness levels X1 and X2 using the parameters $V_b$ and $V_p$, respectively, when the concerned pixel is the last one in the concerned line, wherein the comparison of the brightness data Xij with the parameters $V_b$ and $V_p$ is performed until one of the concerned pixel is the last one and the concerned pixel is the last pixel to be subject to the contrast enhancement.

According to another aspect of the present invention, there is provided a digital image quality enhancing apparatus having a division unit dividing a concerned pixel with an input brightness data Xij, in image data including pixels having predetermined resolutions obtained by scanning a document, into a background area and an area other than the background area, and an enhancement unit performing contrast enhancement on the concerned pixel. In the apparatus, the segmentation unit includes a mediator signal detecting portion detecting a minimum value of the brightness data Xij from a corresponding concerned line and outputting a mediator signal $V_b$ while detecting a maximum value of the brightness data Xij from the corresponding concerned line and outputting a mediator signal $V_p$; a reference signal generating portion outputting a signal X1 derived by applying a predetermined weighting factor α and a predetermined offset a to the mediator signal $V_b$, in response to the mediator signal $V_b$, while outputting a signal X2 derived by applying a predetermined weighting factor β and a predetermined offset b to the mediator signal $V_p$ in response to the mediator signal $V_p$; and an area segmenting portion comparing the brightness data Xij with the signals X1 and X2 and outputting a first background area signal if the brightness data Xij is less than or equal to X1 and a second background area signal if the brightness data Xij is greater than or equal to X2.

Here, the enhancement unit includes an enhancing portion of a dark background area outputting Yij obtained by decreasing a magnitude of the brightness data Xij in response to the first background area signal and the signal X1 using the signal X1 and a predetermined value Y1 corresponding to the signal X1; and an enhancing portion of a light background area outputting Yij obtained by increasing the magnitude of the brightness data Xij using the signal X2 and a predetermined value Y2 corresponding to the signal X2 in response to the second background area signal and signal X2.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DESCRIPTION OF MAJOR REFERENCE CHARACTERS IN DRAWINGS

Figure 1:
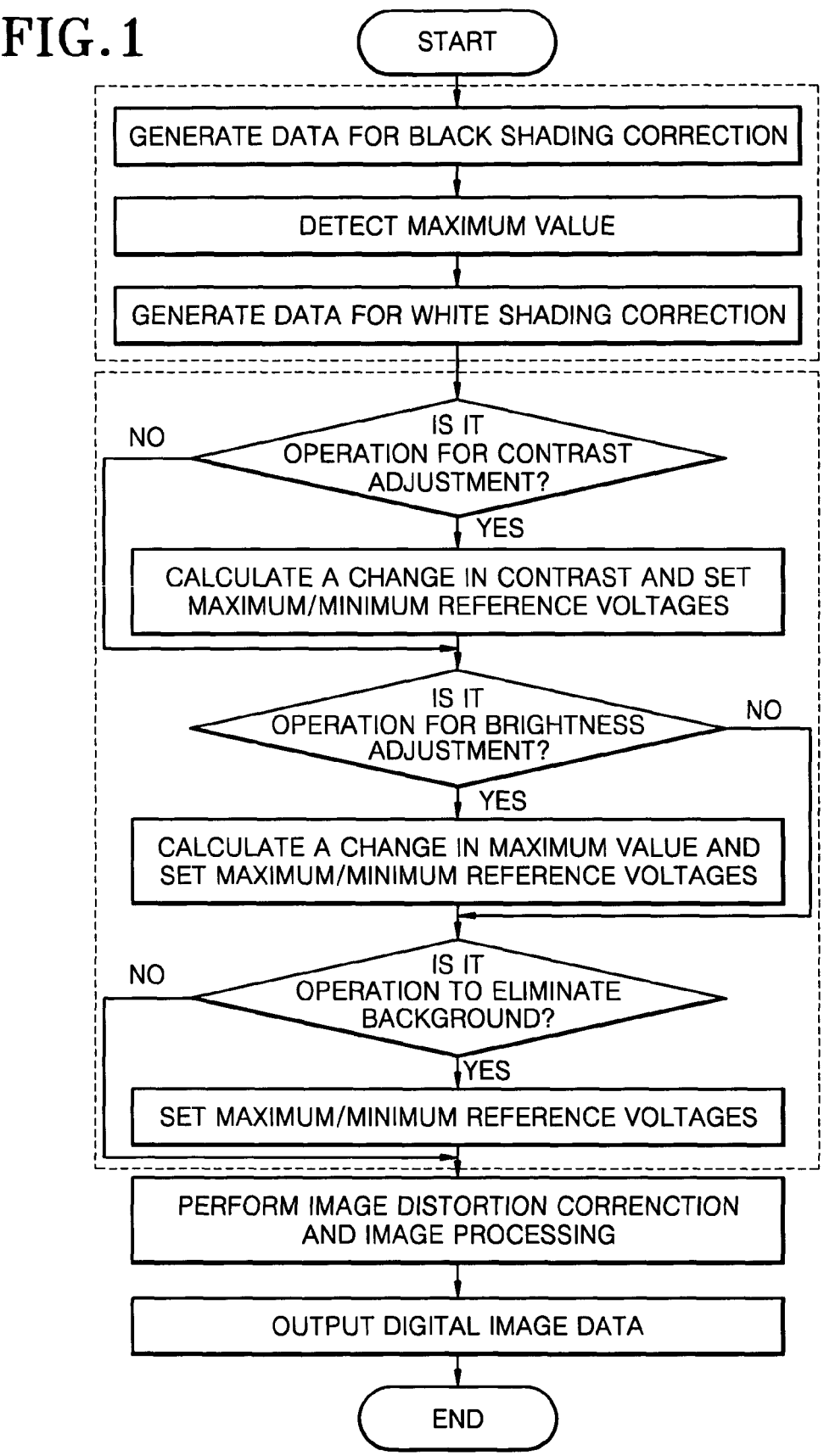
FIG. 1 is a flowchart illustrating a conventional image processing method to enhance digital image quality.

Xij . . . Brightness data or brightness signal of a concerned pixel
Yij . . . Brightness data or brightness signal obtained by performing contrast enhancement on Xij
i . . . Number of a row corresponding to a concerned line
j . . . Column number of a concerned pixel
X1 . . . Reference variable or signal for identifying a dark background area
$V_b$ . . . Parameter or mediator signal for calculating X1
α . . . Weighting factor used in calculating X1
a . . . Offset used in calculating X1
X2 . . . Reference variable or signal for identifying a light background area
$V_p$ . . . Parameter or mediator signal for calculating X1
β . . . Weighting factor used in calculating X2
b . . . Offset used in calculating X2
Δ1 . . . Constant used in resetting $V_b$ and $V_p$
Δ2 . . . Constant used in compensating for $V_b$ and $V_p$
t1 . . . Contrast enhancing coefficient for a dark background area
t2 . . . Contrast enhancing coefficient for a light background area
t3 . . . Contrast enhancing coefficient for non-background area

DETAILED DESCRIPTION OF THE INVENTION

Reference will now be made in detail to the aspects of the present invention, examples of which are illustrated in the accompanying drawings, wherein like reference numerals refer to like elements throughout.

A method to enhance a digital image quality and a configuration and operation of an apparatus performing the same method, according to an aspect of the present invention, will now be described with reference to the accompanying drawings.

The method to enhance the digital image quality, according to an aspect of the present invention, is used to process image data including pixels having a predetermined resolution and obtained with scans from an image input device, such as a scanner.

A typical scanner has a light source reflecting a light beam, a lens to converge the reflected light beam, and an image sensor receiving the converged light beam. The image sensor implemented with a charge coupled device (CCD) or contact image sensor (CIS) includes an array of electrical cells positioned at regular intervals. The image sensor receives the light beam reflected from a document, which is analog image data and discretizes the light beam into digital image data having a predetermined resolution. Here, data from each cell of the image sensor, which is the smallest unit of discretized data, is called a pixel.

A 'concerned pixel' means a pixel being subjected to a digital image quality enhancing method, according to an aspect of the present invention. According to an aspect of the present invention, image processing for quality enhancement is sequentially performed on each concerned pixel and adjacent pixels. That is, after the image quality enhancement method is performed on the concerned pixel, the method is sequentially performed in the same way with the adjacent pixel being the concerned pixel. A 'concerned line' refers to a row to which each concerned pixel belongs. For example, original brightness data of each concerned pixel is denoted by 'Xij' where i and j are a row number corresponding to the concerned line and a column number, respectively.

Figure 2:
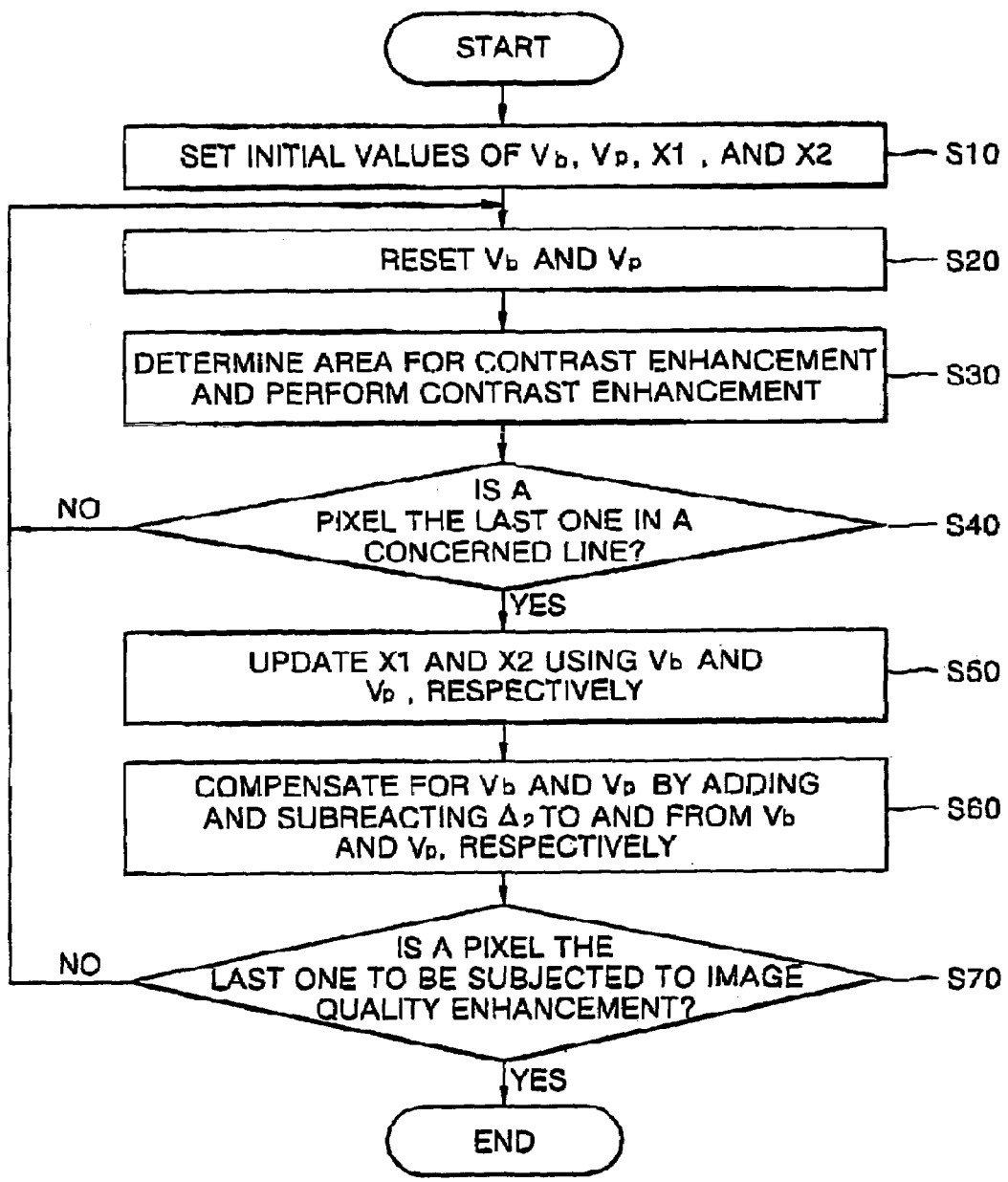
FIG. 2 is a flowchart illustrating a method to enhance digital image quality, according to an aspect of the present invention.

FIG. 2 is a flowchart illustrating a method to enhance the digital image quality, according to an aspect of the present invention. The method includes at operation S10, setting initial values of variables $V_b$, $V_p$, X1, and X2, at operation S20, resetting the variables $V_b$ and $V_p$, and, at operation S30, performing contrast enhancement. At operation S50, the variables X1 and X2 are updated, and, at operations S40 and S70, the position of the concerned pixel is determined, and at operation S60, $V_b$ and $V_p$ are compensated. Here, operation S60 may be optionally performed. At operation S40, contrast enhancement on the concerned line is performed according to a result obtained by processing a previous line. That is, operations S20 and S50 are performed on each concerned line in order to appropriately perform contrast enhancement on a next concerned line (operation S30).

At operation S10, initial values of variables $V_b$, $V_p$, X1, and X2 are set. The initial values of $V_b$ and $V_p$ are brightness thresholds of the concerned pixel requiring the image quality enhancement, according to an aspect of the present invention. Here, X1 denotes a reference variable to identify a dark background area. If the brightness data Xij of the concerned pixel is less than X1, the concerned pixel belongs to the dark background area. X2 denotes a reference variable to identify the light background area. If the brightness data Xij of the concerned pixel is greater than X2, the concerned pixel belongs to the light background area. The concerned pixel belonging to the area other than the background area in which the brightness data Xij is greater than X1 but less than X2 is not processed as the background but an area to be subjected to the contrast enhancement. $V_b$ and $V_p$ are parameters used in calculating X1 and X2, respectively. X1 and X2 are obtained by applying predetermined weight factors and offsets to $V_b$ and $V_p$, respectively.

As an aspect of operation S10, in case of the image scanned using 256-step gray scale, initial values of $V_b$ and $V_p$ may be set to 50 and 180, respectively. The initial values of X1 and X2 may be set by applying predetermined weight factors and offsets to the initial values of $V_b$ and $V_p$, respectively. At operation S20, values of $V_b$ and $V_p$ are reset. The brightness data Xij of the concerned pixel is compared with $V_b$, and $V_b$ is reset according to a result of the comparison. Similarly, the brightness data Xij is compared with $V_p$, and $V_p$ is reset according to a result of the comparison. Operation S20 is also provided to obtain a maximum brightness data for a light background area from the concerned line.

Figure 3:
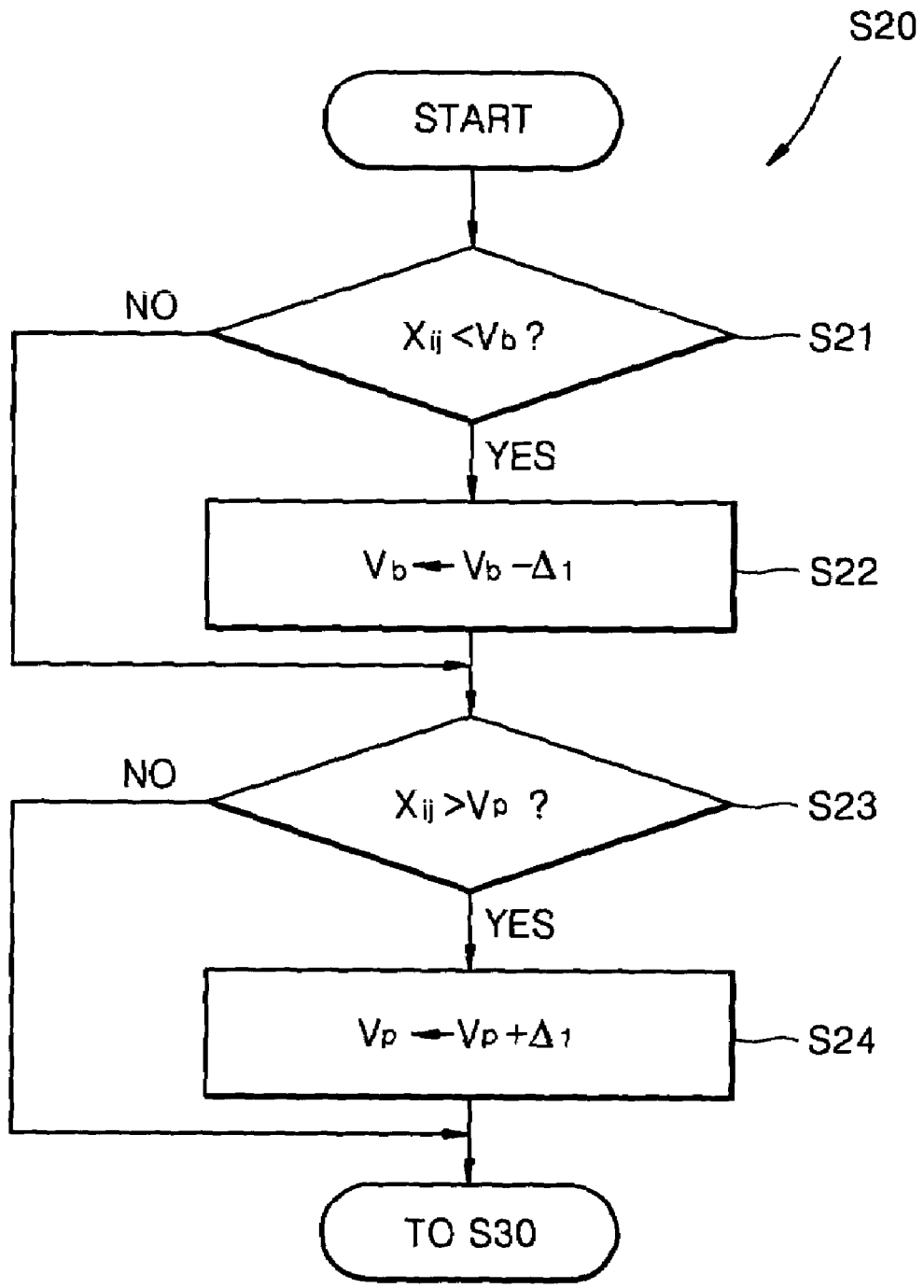
FIG. 3 is a flowchart illustrating operation S20 shown in FIG. 2, according to an aspect of the present invention.

FIG. 3 is a flowchart illustrating operation S20 shown in FIG. 2, according to an aspect of the present invention. In FIG. 3, operation S20 is subdivided into operations S31–S34. At operation S21, a determination is made as to whether the brightness data Xij of the concerned pixel is less than $V_b$. In operation S22, if it is determined that the brightness data Xij is less than $V_b$, a predetermined constant $\Delta 1$ is subtracted from $V_b$ in order to reset $V_b$. At operation S23, a determination is made as to whether the brightness data Xij of the concerned pixel is greater than $V_p$. At operation S24, if it is determined that the brightness data Xij is greater than $V_b$, the predetermined constant $\Delta 1$ is added to $V_p$ in order to reset $V_p$.

In operations S22 and S24 described above, a predetermined value is subtracted from $V_b$ or added to $V_p$ in a way such that text or picture area in an input gray-scale image data, the brightness of which sharply changes, may not be misconceived as the background area. For example, $\Delta 1$ may be set to 1 in a 250-step gray scale.

Figure 4:
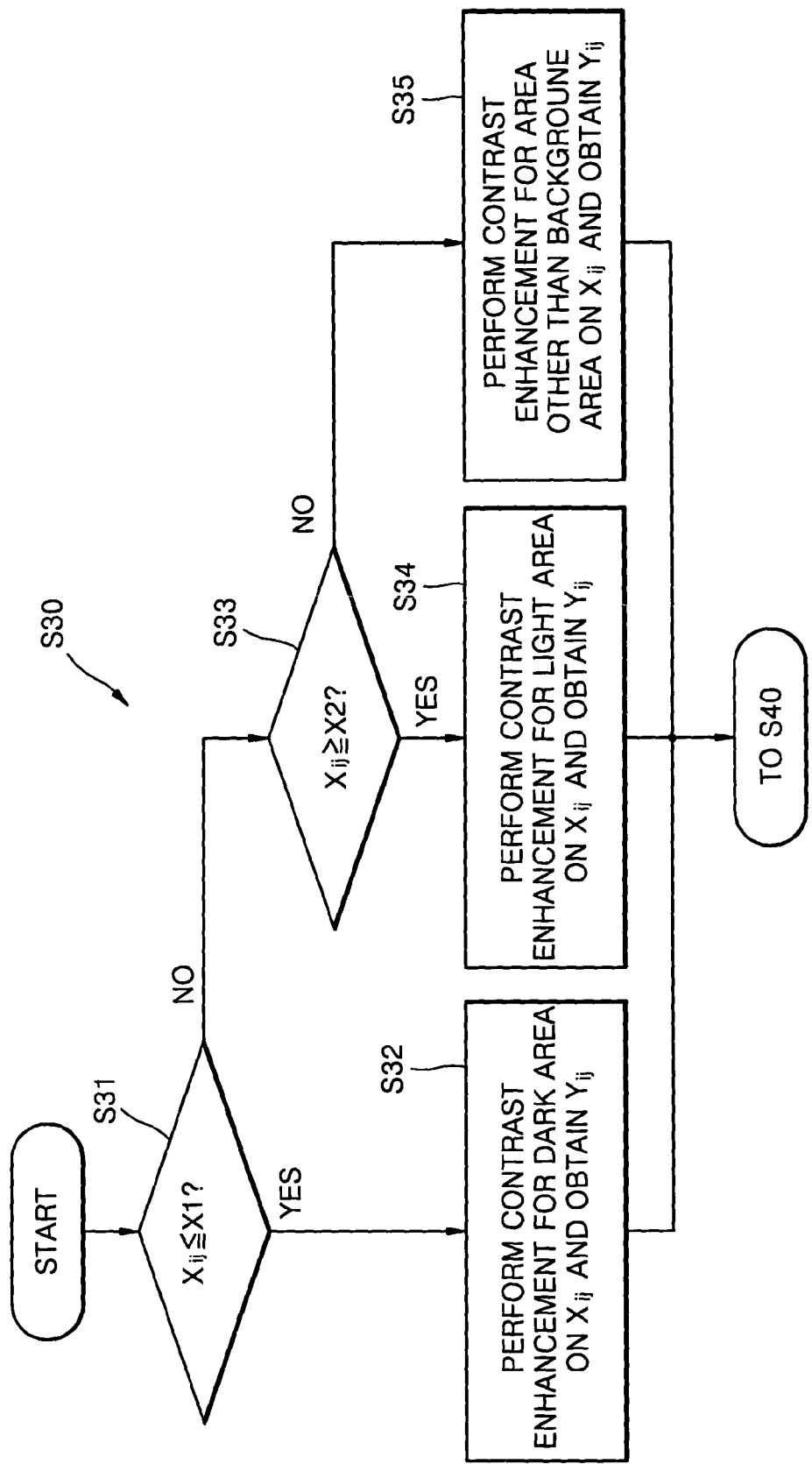
FIG. 4 is a flowchart illustrating operation S30 shown in FIG. 2, according to an aspect of the present invention.

At operation S30, a background area to be subjected to contrast enhancement processing is determined and contrast enhancement is performed on the background area. FIG. 4 is a flowchart illustrating operation S30 shown in FIG. 2, according to an aspect of the present invention. Referring to FIG. 4, in operations S31 through S34, the brightness data Xij of the concerned pixel is compared with either X1 or X2 and the contrast enhancement is performed on the dark or light background area depending on a result of comparison.

At operation S31, a determination is made as to whether the brightness data Xij of the concerned pixel is less than or equal to X1. If it is determined that the brightness data Xij is less than or equal to X1, at operation S32, the contrast enhancement for the dark background area is performed on the brightness data Xij to obtain brightness data Yij with enhanced contrast.

According to an aspect of the present invention, operation S32 is represented by Equation (1):

$$Yij = t1 \cdot Xij, \ 0 \leq Xij \leq X1 \quad (1)$$

Where t1 is a contrast enhancing coefficient for the dark background area and equals Y1/X1. Y1, which denotes an output pixel value corresponding to the reference value X1 for the concerned pixel, is pre-designated according to needs of users or manufacturers and applied to the contrast enhancement for the dark background area. If Y1 is less than the reference value X1 as an aspect of the present invention, the brightness data Xij of the concerned pixel belonging to the dark background area is mapped onto new brightness data Yij obtained by performing the contrast enhancement on the brightness data Xij so as to make the brightness data Xij darker.

If it is determined that the brightness data Xij is greater than X1 in operation S31, then operation S33 is performed to determine whether the brightness data Xij is greater than or equal to X2. If it is determined that the brightness data Xij is greater than or equal to X2, at operation S34, the contrast enhancement for the light background area is performed on the brightness data Xij to obtain brightness data Yij with enhanced contrast (step S34).

According to an aspect of the present invention, opeation S34 where 256-step gray scale is used, is represented by Equation (2):

$$Yij = t2 \cdot (Xij - X2) + Y2, \ X2 \leq Xij \leq 255 \quad (2)$$

Where t2 is a contrast enhancing coefficient for a dark background area and equals (255−Y2)/(255−X2). Y2, which denotes an output pixel value corresponding to the reference value X2 for the concerned pixel, is pre-designated according to the needs of the users or the manufacturers and applied to the contrast enhancement for the light background area. If Y2 is greater than the reference value X2, as an aspect of the present invention, the brightness data Xij of the concerned pixel belonging to the light background area is mapped onto the new brightness data Yij by performing the contrast enhancement on the brightness data Xij so as to make the brightness data Xij lighter.

Figure 5:
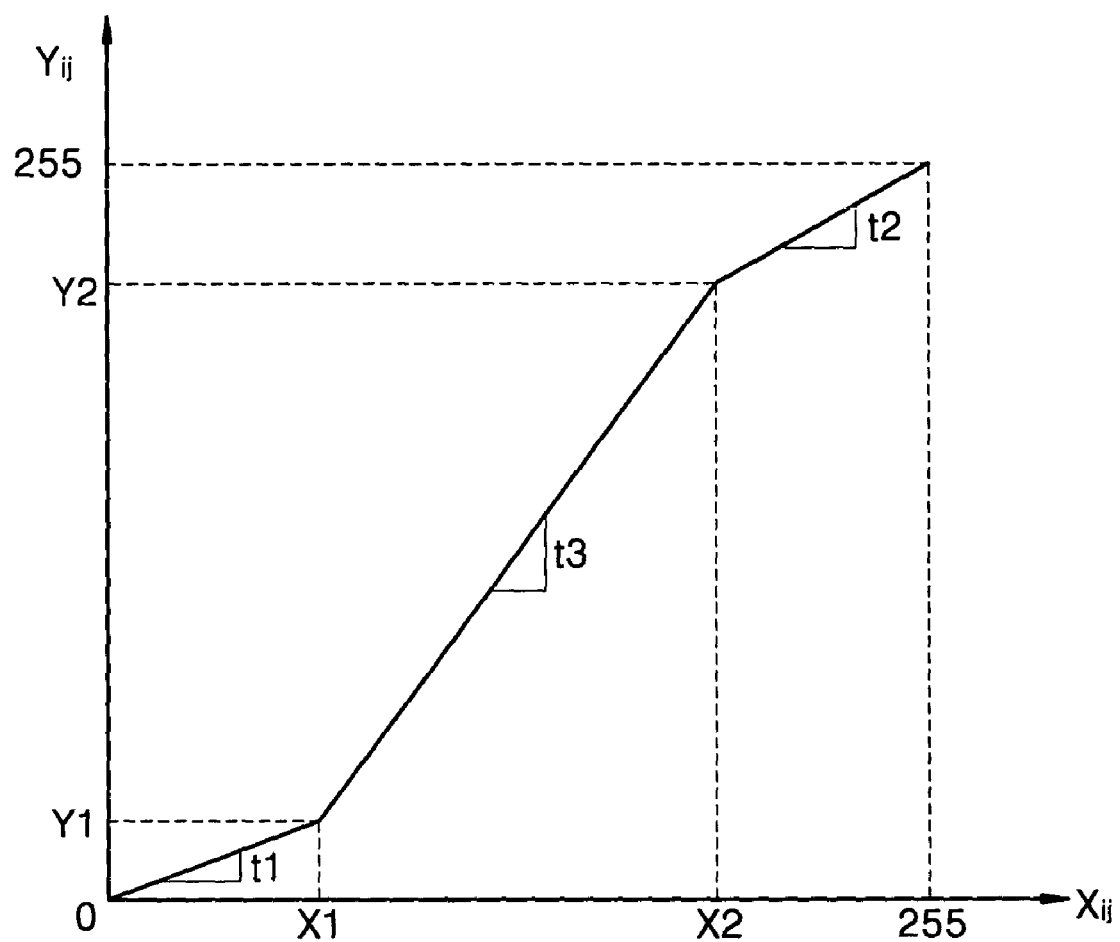
FIG. 5 is a graph showing a transform function of contrast enhancement performed by operation S30.

FIG. 5 is a graph illustrating a transform function of the contrast enhancement performed by operation S30. As shown in FIG. 5, Y1 and Y2 are determined using X1 and X2, respectively, obtained by Equation (4) to be described below, and the contrast enhancement is performed on the original brightness data Xij of the concerned pixel belonging to the dark or light background area to obtain Yij with the enhanced contrast using the Equations (1) or (2).

In the digital image quality enhancing method, according to an aspect of the present invention, operation S35 shown in FIG. 4 may be optionally included to perform the contrast enhancement on the brightness data Xij of the concerned pixel belonging to an area other than the background area where the brightness data Xij is greater than X1 but less than X2 (X1<Xij<X2). At operation S35, if it is determined at operation S33 that the brightness data Xij is less than X2, the contrast enhancement is performed on the area other than the background area to map the brightness data Xij onto Yij which is greater than Y1 but less than Y2. As an aspect of operation S35, the brightness data Yij with the enhanced contrast is obtained using Equation (3):

$$Yij = t3 \cdot (Xij - X1) + Y1, \ X1 \leq Xij \leq X2 \quad (3)$$

A contrast enhancing coefficient t3 for an area other than the background area equals (Y2−Y1)/(X2−X1). If operation S35 is not performed, the pixels belonging to the dark or light background area are subjected to the contrast enhancement as in operations S32 or S34. The pixels belonging to the area other than the background area, that is, the output brightness data Yij which is not contrast-enhanced, is the same as the originally input brightness data Xij. In contrast, if operation S35 is performed, the contrast enhancement is performed on the area other than the background area for the pixels to have the brightness data Yij with the enhanced contrast.

At operation S40, it is determined whether the concerned pixel is the last pixel in the concerned line. If the method determines that it is not the last pixel, the method returns to operation S20 in order to proceed. Because X1 and X2 are updated every line, operation S60 serves as a pre-step to operation S70 for updating X1 and X2.

At operation S50, if the method determines that the concerned pixel is the last pixel in the concerned line, X1 and X2 are updated using $V_b$ and $V_p$, respectively.

In an aspect of operation S50, operations S51 and S52 are also included. Specifically, in operation S51, X1 is updated with a value derived by multiplying a predetermined weighting factor α by $V_b$ and adding a predetermined offset a to that product. At operation S52, X2 is updated with the value derived by multiplying a predetermined weighting factor β by $V_p$ and adding a predetermined offset b to that product. That is, X1 and X2 are updated using Equation (4):

$$X1 = \alpha V_b + a$$

$$X2 = \beta V_p + b \quad (4)$$

The predetermined weighting factors α and β may be determined in a range between 0 and 1, 0 exclusive, i.e. 0<α≦1 and 0<β1. Also, offsets a and b may be determined in the range between −128 and 127, inclusive i.e., −128≦a≦127 and −128≦b≦127.

As can be seen in Equation (4), If α=1 and a=0, X1 equals $V_b$, and if β=1 and b=0, X2 equals $V_p$. By varying values X1 and X2 depending on $V_b$ and $V_p$ in this way, the brightness of an area to be subject to the contrast enhancement can be adjusted according to the needs of the users and the manufacturers.

Operation S60 may be optionally provided to prevent a momentary saturation of $V_b$ and $V_p$. In operation S60, $V_b$ and $V_p$ are updated to compensate for the momentary saturation. The method then proceeds to operation S70. At operation S70, $V_b$ and $V_p$ are compensated for by subtracting and adding a predetermined value, respectively, (operation S61) and by comparing those values against associated initial values (operation S62). At operation S61, a predetermined constant Δ2 is added to $V_b$ and subtracted from $V_p$ in order to update $V_b$ and $V_p$. At operation S62, if the value produced by compensating for $V_b$ by addition is greater than the initial value of $V_b$ set at operation S10, the compensation has no effect so $V_b$ is updated with the initial value of $V_b$ set at operation S10. In the meantime, if the value produced by compensating for $V_p$ by subtraction is less than the initial value of $V_p$ set at operation S10, compensation has no effect so $V_p$ is updated with the initial value of $V_p$ set at operation S10. That is, operations S61 and S62 are represented by Equation (5):

$$V_b = \min$$

$$V_p = \max \quad (5)$$

Where compensating constant Δ2 may be set to 4 in a 256-step gray scale.

Finally, at operation S70, the method determines whether to finish the digital image quality enhancement method, according to an aspect of the present invention. That is, the method determines whether the concerned pixel is the last pixel to be subjected to the image quality enhancement processing, and if the method determines that the concerned pixel is the last one, the image quality enhancement method is finished. In contrast, if the method does not determine that the concerned pixel is the last one, the process returns to operation S20 in order to repeat the image quality enhancement processing.

Figure 6:
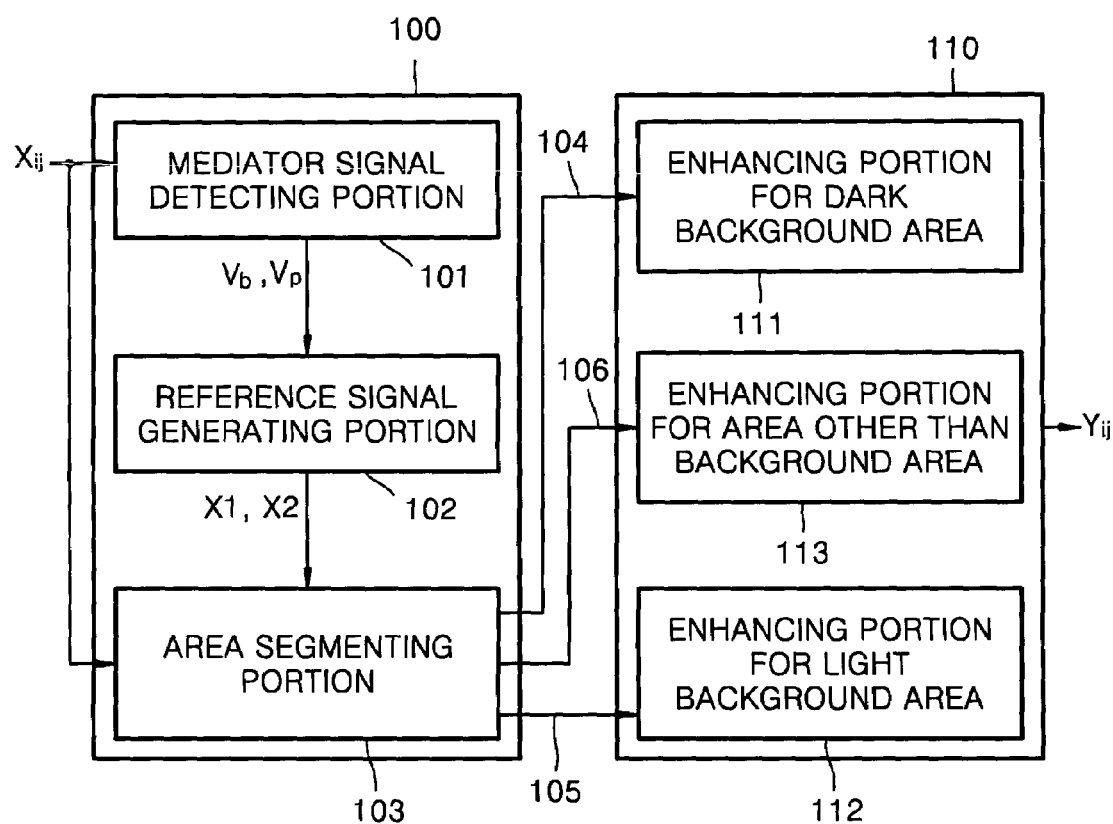
FIG. 6 is a block diagram of an apparatus to enhance digital image quality, according to an aspect of the present invention.

FIG. 6 is a block diagram of an apparatus to enhance the digital image quality, according to an aspect of the present invention. Referring to FIG. 6, the apparatus includes a segmentation unit 100 and an enhancement unit 110.

With regard to the image data including the pixels having the predetermined resolutions obtained by scanning the document, the segmentation unit 100 segments the concerned pixel with the externally input brightness data Xij into the background area requiring the contrast enhancement and the area other than the background area. The segmentation unit 100 is subdivided to include a mediator signal detecting portion 101, a reference signal generating portion 102, and an area segmenting portion 103. The mediator signal detecting portion 101 detects a minimum value of the brightness data Xij from the corresponding concerned line and outputs a mediator signal $V_b$ while detecting a maximum value of the brightness data Xij from the corresponding concerned line and outputs a mediator signal $V_p$. The reference signal generating portion 102 outputs the signal X1 derived by applying the weighting factor α and the offset a to $V_b$ while outputting the signal X2 derived by applying the weighting factor β and the offset b to $V_p$. The area segmenting portion 103 compares the brightness data Xij with either X1 or X2 and outputs a first background area signal 104 if the brightness data Xij is less than or equal to X1 and a second background area signal 105 if the brightness data Xij is greater than or equal to X2. The enhancement unit 110, the function of which will be described below in detail, may optionally include an enhancing portion 113 for an area other than the background area shown in FIG. 6. The area segmenting portion 103 may also output an area other than the background area signal 106 input to the enhancing portion 113 for the area other than the background area. Here, the area other than the background area signal 106 may be output by the area segmenting portion 103 when X1ij is compared with either X1 or X2 and the brightness data Xij is greater than X1 but less than X2.

The enhancement unit 110 performs the contrast enhancement processing on the concerned pixel belonging to the background area. The enhancement unit 110 is broken down into two components: an enhancing portion 111 for the dark background area and an enhancing portion 112 for the light background area. The enhancement unit 110 may further include the enhancing portion 113 for an area other than the background area. The enhancing portion 111 for the dark background area outputs the signal Yii obtained by enhancing Xij using the signal X1 and the predetermined value Y1 corresponding to the signal X1 in response to the first background area signal 104 and the signal X1. That is, the signal Yij is obtained by the operation in Equation (6):

$$Yij = \frac{Y1}{X1} Xij \quad (6)$$

where Y1 is an output pixel value corresponding to the signal X1 for the concerned pixel. Y1 is predesignated according to the needs of the users or the manufacturers and applied to the contrast enhancement for the dark background area.

The enhancing portion 112 for the light background area outputs the signal Yij obtained by enhancing the brightness signal Xij using the signal X2 and the predetermined value Y2 corresponding to signal X2 in response to the second background area signal 105 and the signal X2. Here, the signal Yij is obtained by the operation in Equation (7):

$$Yij = \frac{255 - Y2}{255 - X2}(Xij - X2) + Y2 \quad (7)$$

where Y2 is an output pixel value corresponding to the signal X2 for the concerned pixel. Y1 is predesignated according to the needs of the users or the manufacturers and applied to the contrast enhancement for the light background area.

In the digital image quality enhancing apparatus, according to an aspect of the present invention, the enhancement unit 110 may further include the enhancing portion for the area other than the background area that outputs the signal Yij obtained by enhancing the brightness data Xij using the signals X1 and X2 and the predetermined values Y1 and Y2 in response to the area other than the background area signal 106 and signals X1 and X2. The enhancing portion 113 for the area other than the background area obtains Yij with enhanced contrast using Equation (8):

$$Yij = \frac{Y2 - Y1}{X2 - X1}(Xij - X1) + Y1 \qquad (8)$$

As described above, the method and apparatus to enhance digital image quality, according to an aspect of the present invention are applied adaptively according to a document image having various characteristics input from an image input device of an image processing apparatus, thus, enabling automatic contrast enhancement at high speed without a need for pre-processing.

While the present invention has been particularly shown and described with reference to aspects thereof, it will be understood by those of ordinary skill in the art that various changes in form and details may be made therein without departing from the spirit and scope of the present invention as defined by the appended claims.

What is claimed is:

1. A method to enhance a digital image quality wherein original brightness data Xij of a concerned pixel is compared with predetermined brightness levels X1 and X2, which are reference variables to obtain new brightness data Yij, with an enhanced contrast, the method comprising:
   setting initial values of a parameter $V_b$ to calculate the brightness level X1, a parameter $V_p$ to calculate the brightness level X2, the brightness level X1, and the brightness level X2;
   comparing the brightness data Xij with the parameters $V_b$ and $V_p$, respectively, and outputting results indicative thereof;
   resetting the parameters $V_b$ and $V_p$ according to the results of the comparison;
   identifying a background area according to the results of the comparison between the brightness data Xij and parameter X1 or X2;
   performing the contrast enhancement on pixels belonging to the background area; and
   updating the brightness levels X1 and X2 using the parameters $V_b$ and $V_p$, respectively, when the concerned pixel is the last one in the concerned line,
   wherein the comparison of the brightness data Xij with the parameters $V_b$ and $V_p$ is performed until one of the concerned pixel is the last one and the concerned pixel is the last pixel to be subject to the contrast enhancement.

2. The method of claim 1, wherein the comparison of the brightness data Xij with the parameters $V_b$ and $V_p$ comprises:
   determining whether the brightness data Xij of the concerned pixel is less than the parameter $V_b$;
   subtracting a predetermined constant Δ1 from the parameter $V_b$ and resetting a value of $V_b$ when the brightness data Xij is less than the parameter $V_b$;
   determining whether the brightness data Xij of the concerned pixel is greater than the parameter $V_p$; and
   adding the predetermined constant Δ1 to the parameter $V_p$ and resetting a value of $V_p$ when the brightness data Xij of the concerned pixel is greater than the parameter $V_p$.

3. The method of claim 1, wherein the identifying of the background area comprises:
   determining whether the brightness data Xij is less than or equal to the brightness level X1;
   performing a contrast enhancement of the dark background area by mapping the brightness level X1 and the brightness data Xij onto a predetermined value Y1 and the new brightness data Yij, which is less than or equal to the predetermined value Y1, respectively when the brightness data Xij is less than or equal to the brightness level X1;
   determining whether the brightness data Xij is greater than or equal to the brightness level X2 when the brightness data Xij is greater than the brightness level X1; and
   performing the contrast enhancement of the light background area by mapping the brightness level X2 and the brightness data Xij onto a predetermined value Y2 and the new brightness data Yij, which is greater than or equal to the predetermined value Y2 when the brightness data Xij is greater than or equal to the brightness level X2.

4. The method of claim 3, wherein the new brightness data Yij, which is less than or equal to the predetermined value Y1, with the enhanced contrast is obtained using the following equation:

$$Yij = \frac{Y1}{X1} Xij.$$

5. The method of claim 3, wherein the new brightness data Yij, which is greater than or equal to the predetermined value Y2, with the enhanced contrast is obtained using the following equation:

$$Yij = \frac{255 - Y2}{255 - X2}(Xij - X2) + Y2.$$

6. The method of claim 3, further comprising:
   performing the contrast enhancement for an area other than the background area by mapping the brightness data Xij onto the new brightness data Yij, which is greater than Y1 but less than Y2, when the brightness data Xij is less than the brightness level X2.

7. The method of claim 6, wherein the new brightness data Yij with enhanced contrast is obtained using the following equation:

$$Yij = \frac{Y2 - Y1}{X2 - X1}(Xij - X1) + Y1.$$

8. The method of claim 1, wherein the updating of the brightness levels X1 and X2 comprises:
   updating the brightness level X1 with a value derived by a first product of multiplying a predetermined weighting factor α by the parameter $V_b$ and adding a predetermined offset to the first product; and
   updating the brightness level X2 with a value derived by a second product of multiplying a predetermined weighting factor β by the parameter $V_p$ and adding a predetermined offset b to the second product.

9. The method of claim 8, wherein the weighting factor α is determined in a range between 0 and 1, 0 exclusive (0<α≦1).

10. The method of claim 8, wherein the offset a is determined in a range between −128 and 127, inclusive (−128≦a≦127).

11. The method of claim 8, wherein the weighting factor β is determined in a range between 0 and 1, 0 exclusive (0<β≦1).

12. The method of claim 8, wherein the offset b is determined in a range between −128 and 127, inclusive (−128≦a≦127).

13. The method of claim 1, further comprising:
compensating the parameters $V_b$ and $V_p$.

14. The method of claim 13, wherein the compensation of the parameters $V_b$ and $V_p$ comprises:
updating $V_b$ and $V_p$ after adding and subtracting a predetermined constant Δ2 to and from the parameters $V_b$ and $V_p$, respectively; and
updating $V_b$ with the initial value of $V_b$ if $V_b$ compensated by the addition is greater than the initial value of $V_b$, and
updating $V_p$ with the initial value of $V_p$ if $V_p$ compensated by the subtraction is less than the initial value of $V_p$ set.

15. A digital image quality enhancing apparatus having a division unit dividing a concerned pixel with an input brightness data Xij, in image data comprised of pixels having predetermined resolutions obtained by scanning a document, into a background area and an area other than the background area, and an enhancement unit performing contrast enhancement on the concerned pixel, wherein the division unit comprises:
a mediator signal detecting portion detecting a minimum value of the brightness data Xij from a corresponding concerned line and outputting a mediator signal $V_b$, while detecting a maximum value of the brightness data Xij from the corresponding concerned line and outputting a mediator signal $V_p$;
a reference signal generating portion outputting a signal X1 derived by applying a predetermined weighting factor α and a predetermined offset a to the mediator signal $V_b$, in response to the mediator signal $V_b$, while outputting a signal X2 derived by applying a predetermined weighting factor β and a predetermined offset b to the mediator signal $V_p$ in response to the mediator signal $V_p$; and
an area segmenting portion comparing the brightness data Xij with the signals X1 and X2 and outputting a first background area signal if the brightness data Xij is less than or equal to X1 and a second background area signal if the brightness data Xij is greater than or equal to X2.

16. The apparatus of claim 15, wherein the enhancement means comprises:
an enhancing portion of a dark background area outputting Yij obtained by decreasing a magnitude of the brightness data Xij in response to the first background area signal and the signal X1 using the signal X1 and a predetermined value Y1 corresponding to the signal X1; and
an enhancing portion of a light background area outputting Yij obtained by increasing the magnitude of the brightness data Xij using the signal X2 and a predetermined value Y2 corresponding to the signal X2 in response to the second background area signal and signal X2.

17. The apparatus of claim 16, wherein the enhancing portion for the dark background area outputs the signal Yij, which is brightness data with enhanced contrast, obtained by the following Equation:

$$Yij = \frac{Y1}{X1} Xij.$$

18. The apparatus of claim 16, wherein the enhancing portion for the light background area outputs the signal Yij, which is brightness data with the enhanced contrast, obtained by the following equation:

$$Yij = \frac{255 - Y2}{255 - X2}(Xij - X2) + Y2.$$

19. The apparatus of claim 16, wherein the enhancement unit further comprises:
an enhancing portion of an area other than the background area that outputs Yij obtained by enhancing the brightness data Xij in response to the area other than the background area and the signals X1 and X2 using the signals X1 and X2 and values Y1 and Y2,
wherein the area other than the background area signal is output by the area segmenting portion if the brightness data Xij is greater than X1 but less than X2.

20. The apparatus of claim 19, wherein the enhancing portion of an area other than the background area outputs brightness data Yij with the enhanced contrast using the following equation:

$$Yij = \frac{Y2 - Y1}{X2 - X1}(Xij - X1) + Y1.$$

* * * * *

UNITED STATES PATENT AND TRADEMARK OFFICE
CERTIFICATE OF CORRECTION

| | | |
|---|---|---|
| PATENT NO. | : 7,187,808 B2 | Page 1 of 1 |
| APPLICATION NO. | : 10/656835 | |
| DATED | : March 6, 2007 | |
| INVENTOR(S) | : Won-Kyoung Cho et al. | |

It is certified that error appears in the above-identified patent and that said Letters Patent is hereby corrected as shown below:

Column 9, Line 37, change "$V_P$" to --$V_p$--.

Signed and Sealed this

Tenth Day of July, 2007

JON W. DUDAS
*Director of the United States Patent and Trademark Office*